C. G. PRICE.
Improvement in Binders' Attachment for Harvesters.
No. 130,865.  Patented Aug. 27, 1872.
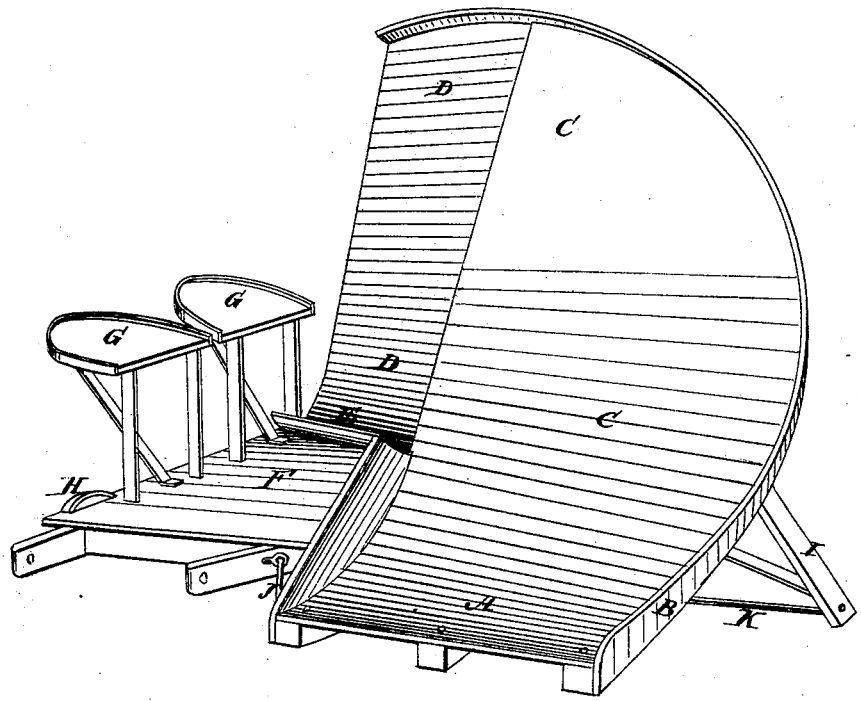
Witnesses:
Inventor:
C. G. Price
PER
Attorneys.

UNITED STATES PATENT OFFICE.

CHAUNCEY G. PRICE, OF AMANA, IOWA.

IMPROVEMENT IN BINDERS' ATTACHMENTS FOR HARVESTERS.

Specification forming part of Letters Patent No. 130,865, dated August 27, 1872.

Specification describing a new and useful Improvement in Binders' Attachments for Reapers, invented by CHAUNCEY G. PRICE, of Amana, in the county of Iowa and State of Iowa.

The figure is a perspective view of my improved attachment.

My invention has for its object to furnish an improved attachment for reapers, to enable the gavels to be conveniently bound before being dropped from the machine; and it consists in the construction and combination of the various parts, as hereinafter more fully described.

A is the front end of the platform, which is designed to be bolted to the finger-bar of the machine, and upon which the grain falls from the sickles. B is a fender-board attached to the outer edge of the platform, and which may be used or not according to the kind of reaper to which the device is to be attached. C is a curved upward extension of the platform, up which the grain is swept by the rake, and from which the grain passes to the inclined plane D, down which it slides to the trough E, from which it is removed by the binders. F is the platform upon which the binders stand, and the forward edge of which is bolted to the frame-work of the reaper. G are the binder's tables, upon which the grain is laid by the binders to be bound, and which are attached to the platform F. The platform F is supported upon the wheel H connected with its side edge, and by a caster-wheel connected with its rear part, and which is not shown in the figure. The outer edge of the platform A C is supported by a standard, I, which is designed to be bolted to the reel-bar or to the bar extending back from the finger-bar, according to the construction of the reaper with which the device is designed to be connected. The platform A C is connected with and partly supported from the platform F by the rods J K. The upper end of the rod J is pivoted to the platform F and its lower end to the platform A C. One end of the rod K is pivoted to the rear part of the platform F, and its other end to the standard I.

This construction allows the platform A C to move with the finger-bar without getting out of its relative position with respect to the platform F.

Having thus described my invention, I claim as new and desire to secure by Letters Patent—

The inclined and curved platform A C, inclined plane D, trough E, binder's platform F, binder's tables G, standard I, and pivoted connecting-rods J K, said parts being constructed and arranged in connection with each other, substantially as herein shown and described, to adapt them for attachment to a reaper, as and for the purpose set forth.

CHAUNCEY G. PRICE.

Witnesses:
ROSWELL S. PRICE,
A. D. SANDBORN.